United States Patent Office 3,546,290
Patented Dec. 8, 1970

---

3,546,290
BICYCLO[2.2.2]OCTANE-1-AMINES AND BICYCLO
[2.2.2]OCTANE-1-METHYLAMINES
James C. Kauer, Wilmington, Del., assignor to E. I.
du Pont de Nemours and Company, Wilmington, Del.,
a corporation of Delaware
No Drawing. Continuation-in-part of application Ser. No.
529,935, Feb. 25, 1966, which is a continuation-in-part
of application Ser. No. 375,337, June 15, 1964, which
in turn is a continuation-in-part of application Ser. No.
277,141, May 1, 1963. This application July 17, 1968,
Ser. No. 745,378
Int. Cl. C07c 87/40; C07d 27/24; A61k 27/00
U.S. Cl. 260—563                                6 Claims

ABSTRACT OF THE DISCLOSURE

Bicyclo[2.2.2]octane-1-amines and bicyclo[2.2.2.]octane-1-methylamines inhibit and deter the incidence and growth of a variety of harmful viruses.

RELATED APPLICATIONS

This application is a continuation-in-part of my application Ser. No. 529,935, filed Feb. 25, 1966, now abandoned, which is a continuation-in-part of application Ser. No. 375,337, filed June 15, 1964, now abandoned, which is a continuation-in-part of application Ser. No. 277,141, filed May 1, 1963, now abandoned.

SUMMARY OF THE INVENTION

In summary, this invention relates to compounds of the formula
(1)

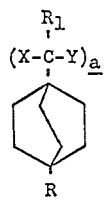

wherein R is hydrogen or alkyl of 1 through 4 carbon atoms; $\alpha$ is 0 or 1; X and Y can be the same or different and are hydrogen, methyl or ethyl; and $R_1$ is

wherein $R_2$ and $R_3$ are the same or different and are hydrogen, alkyl of 1 through 4 carbon atoms, alkeynl of 3 through 5 carbon atoms, wherein the unsaturated bond is in other than the 1-position, propargyl, $\beta$-hydroxyethyl, cyclopropyl, cyclobutyl or cyclopropylmethyl and when R is hydrogen, methyl or ethyl, $R_1$ can also be

where $n$ is 3, 4 or 5; with the proviso that when $R_1$ is

and one or both of $R_2$ and $R_3$ are allyl the sum of the carbon atoms in R, $R_2$ and $R_3$ does not exceed 7 and the proviso that when $R_1$ is

and $R_2$ and $R_3$ are both other than allyl, the sum of the carbon atoms in R, $R_2$ and $R_3$ does not exceed 5; and nontoxic acid addition salts of said compounds.

DETAILED DESCRIPTION OF THE INVENTION

This invention relates to substituted bicyclo[2.2.2]octanes. More particularly this invention refers to novel bicyclo[2.2.2]octanes having an amino or substituted-amino group attached directly or through a methylene group to a tertiary or bridgehead nuclear carbon.

The need continues for effective antiviral agents useful for the treatment of virus infections. I have now discovered a novel class of bicyclooctane-1-amines and bicyclooctane-1-methylamines which show outstanding properties in their ability to inhibit and deter incidence and growth of a variety of harmful viruses.

Within the class of compounds of this invention, a remarkable wide range of activity has been noted in standard tissue culture and animal tests. For example, activity in tissue culture tests has been observed against influenza A (strains WSN and swine), influenza A–2 (strains Michigan A/AA, JPC and Jap 305), and influenza D (Sendai strain). In vivo tests in mice have indicated activity against such virus strains as swine, Michigan A/AA, JPC and Sendai, as well as herpes and Semliki forest. Therapeutic as well as prophylactic activity has been noted.

Compounds hydrolyzable to the compounds of Formula 1 are for most purposes equivalent to those compounds and are of course contemplated as within the present invention.

It also will be understood that the compounds within the scope of Formula 1, having a basic amino group, readily form acid addition salts and such salts having a nontoxic anion are also included within the scope of the present invention. Representative of such salts are the hydrochlorides, hydrobromides, sulfates, phosphates, acetates, succinates, adipates, propionates, tartrates, citrates, bicarbonates, pamoates, cyclohexylsulfamates, and acetylsalicylates. Of these the hydrochlorides, acetates and cyclohexylsulfamates are preferred. The cyclohexylsulfamates have a pleasant taste and thus are particularly useful in preparing syrups for oral administration. Additionally, the cyclohexylsulfamates have usefulness in making uncoated tablets for oral administration which have no objectionable bitter taste. Other salts include those with caprochlorone and with penicillin. The salts described above enhance the usefulness of the relatively insoluble amines in pharmaceutical applications.

Compounds of the above Formula 1 are preferred where R is alkyl and in particular where R is methyl and ethyl. A broad range of antiviral activity is noted in this class of compounds. Unsubstituted amino compounds are preferred by comparison with most of the N-substituted derivatives.

Particularly preferred are the hydrochlorides of the following compounds:

N,N,4-trimethylbicyclo[2.2.2]octane-1-amine
N,4-dimethylbicyclo[2.2.2]octane-1-amine
4-methylbicyclo[2.2.2]octane-1-amine
N-ethyl-4-methylbicyclo[2.2.2]octane-1-amine
4-ethylbicyclo[2.2.2]octane-1-amine
4-ethyl-N-methylbicyclo[2.2.2]octane-amine
$\alpha$-methylbicyclo[2.2.2]octane-1-methylamine
$\alpha,\alpha$-dimethylbicyclo[2.2.2]octane-1-methylamine
$\alpha$,N,4-trimethylbicyclo[2.2.2]octane-1-methylamine
$\alpha$,N,N-4-tetramethylbicyclo[2.2.2]octane-1-methylamine
$\alpha,\alpha$,N-trimethylbicyclo[2.2.2]octane-1-methylamine
$\alpha$,N-dimethylbicyclo[2.2.2]octane-1-methylamine
4-methylbicyclo[2.2.2]octane-1-methylamine
$\alpha$,4-dimethylbicyclo[2.2.2]octane-1-methylamine
$\alpha,\alpha$,4-trimethylbicyclo[2.2.2]octane-1-methylamine 4-ethyl-α-methylbicyclo[2.2.2]octane-1-methylamine
α,α-dimethyl-4-ethylbicyclo[2.2.2]octane-1-methylamine
N-allyl-4-methylbicyclo[2.2.2]octane-1-amine
N-allyl-N,4-dimethylbicyclo[2.2.2]octane-1-amine
N-allyl-α,4-dimethylbicyclo[2.2.2]octane-1-methylamine
N-allyl-α,N,4-trimethylbicyclo[2.2.2]octane-1-methylamine PREPARATION OF BICYCLO[2.2.2]OCTANE - 1-AMINES AND BICYCLOOCTANE - 1 - METHYL-AMINES Bicyclo[2.2.2]octane-1-amine is readily prepared by ammoniation of 1,4-diiodobicyclo[2.2.2]octane at elevated temperature and pressure. The 1,4-diiodo derivative in turn is obtained by heating 1,4-dihydroxybicyclo[2.2.2]octane with an excess of hydriodic acid. The 1,4-dihydroxy compound is prepared from commercially available perchlorocoumalin by heating the latter under ethylene pressure to yield 1,2,3,4-tetrachlorobicyclo[2.2.2]oct-2-ene which is then hydrogenated catalytically to give 1,4-dichlorobicyclo[2.2.2]octane, followed by heating this latter compound in the presence of cuprous oxide and metallic iron to obtain the 1,4-dihydroxy compound.

Alkyl esters of 6-alkyl-α-pyrone-3-carboxylic acid react with ethylene to give 4-alkylbicyclo[2.2.2]oct-2-ene-1-carboxylic acid alkyl esters, which are hydrogenated to the 4-alkylbicyclo[2.2.2]octane-1-carboxylic acid alkyl esters and then hydrolyzed with alkali to give 4-alkylbicyclo[2.2.2]octane-1-carboxylic acids. These versatile intermediates may either be converted to the 4-alkylbicyclo[2.2.2]octane-1-amines by the Schmidt reaction or they may be converted to the 4-alkylbicyclo[2.2.2]octane-1-carboxylic acid chlorides with thionyl chloride, and then to the 4-alkylbicyclo[2.2.2]octane-1-carboxamides by reaction with ammonia. The latter can be reduced with lithium aluminum hydride to give 4-alkylbicyclo[2.2.2]octane-1-methylamines. By starting with alkyl esters of α-pyrone-3-carboxylic acid in this sequence, bicyclo[2.2.2]octane-1-amine and bicyclo[2.2.2]octane-1-methylamine, where R is hydrogen, are easily prepared.

The α-alkylbicyclo[2.2.2]octane-1-methylamines are prepared by reduction of bicyclo[2.2.2]octyl-(1) alkyl ketone oximes with lithium aluminum hydride. The ketones from which these oximes are derived are conveniently made by the reaction of the appropriate dialkyl cadmium with a bicyclo[2.2.2]octane-1-carboxylic acid chloride.

The α,α - dialkylatedbicyclo[2.2.2]octane - 1 - methylamines are made by the reaction of acetonitrile and sulfuric acid (Ritter reaction) with the corresponding α,α-dialkylbicyclo[2.2.2]octane-1-methanol, which gives the N-acetyl-α,α-dialkylbicyclo[2.2.2]octane-1 - methylamine. The amine is obtained by alkaline hydrolysis. The bicyclooctanemethanol starting materials for this reaction are made by the reaction of the appropriate bicyclo[2.2.2]octane-1-carboxylic acid chlorides with alkyl Grignard reagents.

PREPARATION OF N-SUBSTITUTED BICYCLOOCTANE-1-AMINES AND N-SUBSTITUTED BICYCLOOCTANE-1-METHYLAMINES

One or both of the hydrogens of the 1-amino group of the bicyclo[2.2.2]octane-1-amine, 4-alkylbicyclo[2.2.2]octane-1-amines, bicyclo[2.2.2]octane-1-methylamine, the 4-alkylbicyclo[2.2.2]octane-1-methylamines, α-alkylbicyclo[2.2.2]octane-1-methylamines, the α,4-dialkylbicyclo[2.2.2]octane - 1 - methylamines, the α,α-dialkylbicyclo[2.2.2]octane-1-methylamines, or the α,α,4-trialkylbicyclo[2.2.2]octane-1-methylamines can be replaced by alkyl. This is most conveniently done by acylation, for instance with an acyl halide, to give an N-acyl-4-alkylbicyclo[2.2.2]octane-1-amine, which is then reduced to the N,4-dialkylbicyclo[2.2.2]octane-1-amine. Lithium aluminum hydride is excellent for this, although, catalytic hydrogenation or any one of a number of means of reduction can be used. The N-alkylamino compounds can be acylated again and reduced to give the N,N-dialkylamine compounds. Different alkyl groups can be attached by this means.

For instance, reduction of N-acetylbicyclo[2.2.2]octane-1-amine, followed by reaction of the product with propionyl chloride, followed by reduction, gives the N-ethyl-N-propyl compound. Of course, if acetyl chloride is used, the product is N,N-diethylbicyclo[2.2.2]octane-1-amine, where the alkyl groups are alike.

The method of acylation and reduction is quite applicable to preparing N-cyclopropylmethyl compounds. For instance, acylation of 4-methylbicyclo[2.2.2]octane-1-amine with cyclopropanecarboxylic acid chloride gives N-cyclopropylcarbonyl - 4 - methylbicyclo[2.2.2]octane-1-amine, which gives N-cyclopropylmethyl-4-methylbicyclo[2.2.2]octane-1-amine.

While the N-alkylated bicyclo[2.2.2]octane-1-methylamines and 4-alkylbicyclo[2.2.2]octane-1-methylamines can be prepared by the method of acylation and reduction or by alkylation with alkyl halides, the best and simplest method is to prepare the appropriate bicyclo[2.2.2]octane-1-carboxamide from the bicyclo[2.2.2]octane-1-carboxylic acid chloride and the properly substituted amine and reduce it to the desired N-alkylated or N,N-dialkylated compound. For example, reaction of bicyclo[2.2.2]octane-1-carboxylic acid chloride with methylamine gives N-methylbicyclo[2.2.2]octane-1-carboxamide. Reduction of this compound with lithium aluminum hydride gives N-methylbicyclo[2.2.2]octane-1-methylamine. Reduction of an N-alkyl-4-methylbicyclo[2.2.2]octane - 1-carboxamide yields an N-alkyl-4-methylbicyclo[2.2.2]octane-1-methylamine. Reduction of N,4-dimethyl-N-ethylbicyclo[2.2.2]octane-1-carboxamide yields N,4-dimethyl-N-ethylbicyclo[2.2.2]octane-1-methylamine. To make almost any N-alkyl or N,N-dialkyl compound, including those N,N-dialkyl compounds with different alkyl groups, one reacts the appropriate amine with the appropriate carboxylic acid chloride and subjects the resultant amide to reduction.

Although formylation of the amino compound followed by reduction is a practical means of obtaining N-methylamino compounds (see Examples 6 and 7), they can also be obtained as a result of using N-methylacetamide in a modification of the Ritter reaction. In Example 4, this reaction is used to convert 4-methylbicyclo[2.2.2]octan-1-ol to N-acetyl-4-methylbicyclo[2.2.2]octane-1-amine by the action of acetonitrile and sulfuric acid. In Example 9, 1-bromobicyclo[2.2.2]octane is converted to N-acetyl-N-methylbicyclo[2.2.2]octane-1-amine, using N-methylacetamide and silver sulfate. Removal of the acetyl group by alkaline hydrolysis gives N-methylbicyclo[2.2.2]octane-1-amine. This can be acylated and reduced to give the N-methyl-N-alkylbicyclo[2.2.2]octanes-1-amines.

A cyclic lactam, for example pyrrolidine-2-one, can be substituted for N-methylacetamide in the Ritter reaction. The resulting N-[bicyclo[2.2.2]octyl-(1)]lactam can be reduced to the N-[bicyclo[2.2.2]octyl-(1)]cyclic imine (see Example 14).

In some cases, N-alkyl- and N,N-dialkylbicyclo[2.2.2]octane-1-amines are made by alkylation with alkylating reagents (such as alkyl halides). For example, using bicyclo[2.2.2]octane-1-amine with methyl iodide, a mixture is obtained containing N-methylbicyclo[2.2.2]octane-1-amine, N,N-dimethylbicyclo[2.2.2]octane-1-amine (both as the hydroiodide), and [bicyclo(2.2.2)octyl-(1)]-N,N,N-trimethylammonium iodide. These compounds can be separated suitably by treating with a base followed by distillation, fractional crystallization and/or chromatography. This method is less preferred than the method of acylation and reduction. However, sometimes the less preferred method becomes the method of choice because it involves fewer steps.

In preparing N-allyl, N,N-diallyl, N-propargyl and N-allyl-N-propargyl bicyclo[2.2.2]octane-1-amines and 4- alkylbicyclo[2.2.2]octane-1-amines, use of allyl or propargyl bromide with an acid acceptor such as sodium bicarbonate in a solvent such as ethanol is the method of choice. Mixtures of monoallyl, diallyl, monopropargyl and dipropargyl compounds are produced, but the amount of the undesired component can be minimized by varying the amount of halide. With equimolar amounts of the amine and the halide the monosubstituted compounds predominate. With an excess of halide, the disubstituted compounds predominate. In any event, the mono- and disubstituted compounds are relatively easy to separate, for example by distillation. Of course, if the halide is present in huge excess, some quaternization will occur.

2-hydroxyethyl and bis(2-hydroxyethyl) compounds can be made by reaction of the amine with ethylene oxide (see Example 26). Ethylene chloro- and bromohydrin can be used to alkylate the amino group to give the 2-hydroxyethyl substitutions.

Representative of the compounds of this invention are the following, as well as the nontoxic salts of the following compounds:

bicyclo[2.2.2]octane-1-amine
N-methylbicyclo[2.2.2]octane-1-amine
N,N-dimethylbicyclo[2.2.2]octane-1-amine
N-ethyl-N-methylbicyclo[2.2.2]octane-1-amine
N,N-diethylbicyclo[2.2.2]octane-1-amine
N-propylbicyclo[2.2.2]octane-1-amine
N-methyl-N-propylbicyclo[2.2.2]octane-1-amine
N-isopropylbicyclo[2.2.2]octane-1-amine
N-isopropyl-N-methylbicyclo[2.2.2]octane-1-amine
N-sec-butylbicyclo[2.2.2]octane-1-amine
N-isobutylbicyclo[2.2.2]octane-1-amine
N-tert-butylbicyclo[2.2.2]octane-1-amine
N-cyclopropylbicyclo[2.2.2]octane-1-amine
N-cyclopropylmethylbicyclo[2.2.2]octane-1-amine
N-cyclopropylmethyl-N-methylbicyclo[2.2.2]octane-1-amine
N-allylbicyclo[2.2.2]octane-1-amine
N,N-diallylbicyclo[2.2.2]octane-1-amine
N-allyl-N-methylbicyclo[2.2.2]octane-1-amine
N-methyl-N-propargylbicyclo[2.2.2]octane-1-amine
N-propargylbicyclo[2.2.2]octane-1-amine
N-(2-hydroxyethyl)bicyclo[2.2.2]octane-1-amine
N-(2-hydroxyethyl)-N-methylbicyclo[2.2.2]octane-1-amine
N,N-bis(2-hydroxyethyl)bicyclo[2.2.2]octane-1-amine
N-[bicyclo(2.2.2)octyl-(1)]azetidine
N-[bicyclo(2.2.2)octyl-(1)]pyrrolidine
4-methylbicyclo[2.2.2]octane-1-amine
N,N-diethyl-4-methylbicyclo[2.2.2]octane-1-amine
4-butylbicyclo[2.2.2]octane-1-amine
4-isopropylbicyclo[2.2.2]octane-1-amine
4-ethylbicyclo[2.2.2]octane-1-amine
4-propylbicyclo[2.2.2]octane-1-amine
4-tert-butylbicyclo[2.2.2]octane-1-amine
N,N-dimethylbicyclo[2.2.2]octane-1-methylamine
4-tert-butylbicyclo[2.2.2]octane-1-methylamine
4-ethylbicyclo[2.2.2]octane-1-methylamine
4-isopropylbicyclo[2.2.2]octane-1-methylamine
N-allyl-4-methylbicyclo[2.2.2]octane-1-methylamine
N,N-dimethyl-4-ethylbicyclo[2.2.2]octane-1-methylamine.

This invention will be better understood by reference to the following illustrative examples.

EXAMPLE 1

Commercial perchlorocoumalin (150 grams) is slowly heated in a 400-milliliter stainless steel reactor to 170° C., under a maximum pressure of ethylene of 1000 atmospheres. After 10 hours the product is cooled and distilled through a short column (B.P. 135°/5 mm.) to yield substantially pure 1,2,3,4-tetrachlorobicyclo[2.2.2]oct-2-ene. A portion recrystallized from hexane produces white crystals melting at 95.5 to 96° C.

In each of five experiments one fifth of a solution of 1230 grams of the 1,2,3,4-tetrachlorobicyclo[2.2.2]oct-2-ene in 11,840 grams of ethanol is treated with hydrogen in an 8 liter glass reactor at 40 pounds per square inch using 4 grams of platinum oxide catalyst in each run. Crystalline 1,4-dichlorobicyclo[2.2.2]octane deposits directly from the combined solutions. The yield is 752 grams. A portion recrystallized from hexane melts at 233.5° to 234.5° C.

*Analysis.*—Calcd. for $C_8H_{12}Cl_2$ (percent): C, 53.6; H, 6.8; Cl, 39.6. Found (percent): C, 53.9; H, 6.6; Cl, 39.4.

In each of eight experiments, 50 grams of 1,4-dichlorobicyclo[2.2.2]octane, 60 grams of cupric oxide, 24 grams of iron (wire or nails) and 200 milliliters of water is sealed in a 400 milliliter stainless steel reactor provided with means for vigorously agitating the contents. The charge is heated to 215° C. under autogenous pressure for 14 hours. After cooling to room temperature, the products from each of the runs are combined and filtered. The filtrate is extracted continuously with ether. The white crystalline material which crystallizes from the ether solution is sublimed at 110° C. and 0.1 mm. pressure to yield 151 grams of 1,4-dihydroxybicyclo[2.2.2]octane. The solid from the filtration is dried and continuously extracted with ethanol to yield an additional 115 grams of 1,4-dihydroxybicyclo[2.2.2]octane. The total yield is 266 grams (84%).

A portion twice recrystallized from xylene melts at 282–283° C. The proton magnetic resonance spectrum shows the equivalence of all the hydrogens bound to carbon. Infrared absorption spectral analysis in potassium bromide shows strong absorptions at 3210 and 1112 cm.$^{-1}$, typical of hydroxyl groups.

*Analysis.*—Calcd. for $C_8H_{14}O_2$ (percent): C, 67.56; H, 9.93. Found (percent): C, 67.81; H, 10.00.

A solution of 1,4-dihydroxybicyclo[2.2.2]octane is heated with a large excess of hydriodic acid at 150° C. for 24 hours. Thereafter the reaction mixture is allowed to cool, is filtered, the product is washed with water, dried and purified by sublimation in vacuum.

A mixture of 10 grams of 1,4-diiodobicyclo[2.2.2]octane and 30 milliliters of cyclohexane in a 400 cc. stainless steel autoclave is heated to 260° C. for 15 hours under a pressure of 1,000 atmospheres of ammonia. The product is filtered and the filtrate evaporated under vacuum to yield about 2.0 grams of a brown oil (from which colorless crystals of bicyclo[2.2.2]octane-1-amine sublime on standing). The oil is vacuum distilled into a trap cooled by solid carbon dioxide. The resulting mixture of liquid and solid is vacuum-distilled to yield a colorless oil (B.P. 120–121° C./200 mm.) which solidifies to a translucent crystalline mass which sublimes at about 120° C. The product exhibits strong peaks in the infrared spectrum at 3300, 3260, 3190 (shoulder), 2660 (weak), 1600 (broad, med.), 1452, 1375, 1343, 1327 (weak), 1254, 1132, 1108 (weak), 1051, 1019 (weak), 988, 965 (weak), 908 and 812 cm.$^{-1}$. The nuclear magnetic resonance spectrum (in $CCl_4$) exhibits $CH_2$, CH and $NH_2$ absorptions at tau=8.48, 7.23 and 9.22, respectively. Mass spectral analysis verifies the formula as $C_8H_{15}N$.

*Analysis.*—Calcd. for $C_8H_{15}N$ (percent): N, 11.19. Found (percent): N, 11.23, 11.36, 11.22.

The compound reacts rapidly with atmospheric carbon dioxide.

When 20 grams of 1,4-diiodobicyclo[2.2.2]octane, 20 grams of ferric oxide and 100 milliliters of cyclohexane are heated to 260° C. under a pressure of 1,000 atmospheres of ammonia, the same product is obtained.

EXAMPLE 2

A flask containing a solution of 5.00 grams of bicyclo[2.2.2]octane-1-carboxylic acid [Grob et al., Helv. Chem. Acta., 41, 1191 (1958)] in 100 milliliters of chloroform and 30 milliliters of sulfuric acid is warmed in an oil bath held at 45° C. and a total of 3.23 grams of sodium azide is added in small portions over a period of an hour. The resulting solution is stirred overnight at room temperature and then poured on ice. The aqueous layer is separated, washed with ether and treated carefully with excess aqueous sodium hydroxide while cooling strongly. The resulting solution is continuously extracted with ether. The ethereal layer is dried carefully with sodium hydroxide pellets, and the solvent is evaporated under vacuum. The residue is vacuum distilled into a solid carbon dioxide-cooled trap to yield 3.0 grams of white, crystalline bicyclo[2.2.2]octane-1-amine whose infrared spectrum is identical with that of the product described in Example 1, melting at 141.5–142.7° C.

EXAMPLE 3

A mixture of 78.2 grams of alpha-terpinene and 1 gram of phenothiazine is charged into a 180 milliliter silver-lined autoclave. The mixture is heated to 180° C. under a pressure of 2,000 atmospheres of ethylene. The product is combined with the product from another similar experiment in which 40.7 grams of alpha-terpinene and 1 gram of phenothiazine has been similarly treated. The mixture is distilled through a 9-inch Helipak column and yields 29.5 grams of forerun and 60.9 grams of 1-methyl-4-isopropylbicyclo[2.2.2]oct-2-ene, B.P. 92–94° C. at 25 mm.; $n_D^{25}$ 1.4718. The forerun is combined with 0.5 gram of phenothiazine and is heated to 200° C. under a pressure of 2,000 atmospheres of ethylene. Distillation of this latter product yields another 24.2 grams of 1-methyl-4-isopropylbicyclo[2.2.2]oct-2-ene, B.P. 91–92° C. at 23 mm. The total yield is 64%.

*Analysis.*—Calcd. for $C_{12}H_{20}$ (percent): C, 87.7; H, 12.3. Found (percent): C, 88.0; H, 12.3.

A solution of 15.6 grams of 1-methyl-4-isopropylbicyclo[2.2.2]oct-2-ene in methanol and ether is hydrogenated in a Parr apparatus using 0.1 gram of platinum oxide as catalyst. The product is filtered, and solvent is distilled. The residue is distilled through a 9 inch Heligrid column to yield 13.2 grams (84%) of 1-methyl-4-isopropylbicyclo[2.2.2]octane, B.P. 88–89° C. at 19 mm.; $n_D^{25}$, 1.4666

*Analysis.*—Calcd. for $C_{12}H_{22}$ (percent): C, 86.7; H, 13.3; M.W., 166. Found (percent): C, 86.9; H, 13.4; M.W., 157

A mixture of 25 grams of 4-methyl-1-isopropylbicyclo[2.2.2.]octane, 100 milliliters of 70% nitric acid, and 200 milliliters of water is heated at reflux for three days. The mixture is extracted with two 75 milliliter portions of cabron tetrachloride, and the organic layer is separated. The carbon tetrachloride, and the organic is separated. The carbon tetrachloride solution is twice extracted with 50 milliliter portions of 5% sodium hydroxide solution. The alkaline extract is warmed briefly and a stream of nitrogen is passed through to remove solvent. The solution is cooled and acidified with hydrochloric acid. The precipitated crude 4-methyl-bicyclo[2.2.2]octane-1-carboxylic acid is separated by filtration and after air-drying, weighs 7.55 grams. (An additional 1.52 grams is obtained by further oxidation of the neutral fraction obtained by evaporation of the carbon tetrachloride solution.) The total yield of crude acid is 36%. A portion is recrystallized from 60% aqueous acetone to yield colorless crystals of the compound melting at 184.2 to 186.0° C.

*Analysis.*—Calcd. for $C_{10}H_{16}O_2$ (percent): C, 71.39; H, 9.59. Found (percent): C, 71.13, 71.32; H, 9.42, 9.43.

The infrared spectrum in the fingerprint region is very similar to that of bicyclo[2.2.2]octane-1-carboxylic acid but exhibits the characteristic isolated C–$CH_2$ absorption at 1375 cm.$^{-1}$.

NMR SPECTRUM ($CDCl_3$)

| Tau | Appearance | Assignment |
|---|---|---|
| −1.97 | Single, sharp | —COOH |
| 8.42 (center) | Symmetrical $A_2B_2$ pattern | —$CH_2$—$CH_2$— |
| 9.22 | Single, sharp | —$CH_3$ |

These results indicate that no rearrangement of the bicyclo[2.2.2]octane nucleus occurs under the reaction conditions.

A solution of 5.05 grams of 4-methylbicyclo[2.2.2]octane-1-carboxylic acid in 75 milliliters of chloroform (washed with water and dried over calcium chloride) and 20 milliliters of concentrated sulfuric acid is stirred in a flask immersed in an oil bath maintained at 50° C. and 3.0 grams of sodium azide is added in small portions over a period of an hour. The mixture is warmed at 50° C. for an additional two hours and allowed to remain at room temperature overnight. The mixture is poured on 150 grams of crushed ice. Considerable solid (4-methylbicyclo[2.2.2]octane - 1 - amine hydrosulfate) separates and is removed by filtration. The organic layer is separated and discarded. Residual chloroform is removed from the aqueous layer by an extraction with pentane. The solid and the aqueous layer are combined and placed in a 250 milliliter extraction apparatus under a blanket of nitrogen and 40 grams of sodium hydroxide pellets are added over a period of thirty minutes while strongly cooling and stirring the mixture. The alkaline solution is then continuously extracted with ether for eight hours. The ether extract is dried and evaporated to dryness to yield 3.44 grams (82%) of 4-methylbicyclo[2.2.2]octane-1-amine. Nearly the entire quantity of product distills at 84° C./75 mm. The product is a colorless oil which on cooling to −80° C. solidifies to a translucent solid melting at −20 to −21° C.

*Analysis.*—Calcd. for $C_9H_{17}N$ (percent): C, 77.63; H, 12.31; N, 10.06. Found (percent): C, 77.31; H, 12.30; N, 9.75.

It reacts rapidly with atmospheric carbon dioxide to form a white solid. The infrared spectrum exhibits the expected C—$CH_3$ absorption at 1375 cm.$^{-1}$. The NMR spectrum is as follows:

| Tau | Measured area ratio | Calcd. ratio | Appearance | Assignment |
|---|---|---|---|---|
| 9.26 | 3.2 | 3.0 | Single, sharp | $CH_3$ |
| 9.13 | 2.0 | 2.0 | Single | —$NH_2$ |
| 8.59 | 12 | 12 | Single, sharp | —$CH_2$— |

EXAMPLE 4

A mixture of 44 grams of 4-hydroxy-1-methylbicyclo-[2.2.2]octan-2-ene (J. Cologne and R. Vuillemet, Bull. Soc. Chim. France, 1961, 2235) 50 milliliters of hydrazine hydrate, 100 milliliters of triethylamine and 100 milliliters of absolute alcohol is stirred and refluxed for 3.75 hours. Then 200 milliliters of the reaction mixture is distilled off over a five-hour period and finally the flask contents are allowed to cool to room temperature. The wet mass of crystals which separates is diluted with benzene, filtered and dried in vacuo for 48 hours at 50° C. The yield is 39 grams, 82%. This is recrystallized from carbon tetrachloride to give 4-hydroxy-1-methylbicyclo[2.2.2]-octane-2-one hydrazone, M.P. 118–121° C. with resolidification, finally melting at 205 to 206° C.

*Analysis.*—Calcd. for $C_9H_{15}N_2O$ (percent): N, 16.75. Found (percent): N, 16.6.

A solution of 4.40 grams (0.0262 mole) of 4-hydroxy-1-methylbicyclo[2.2.2]octane-2-one hydrazone, 4.0 grams of potassium hydroxide and 12 drops of 95% hydrazine in 40 milliliters of diethylene glycol is placed in a 100 milliliter round-bottom flask with stirrer, thermometer and condenser whose outlet leads to a gas burette. The mixture is heated at 140° C. with stirring for three hours, then the temperature is increased to 170° C. and held at 170° C. for 19 hours. During this time gas is evolved steadily until 890 milliliters (about 0.04 mole as nitrogen) has been collected. The light brown solution is cooled to room temperature, poured into 40 milliliters of water, and the resulting solution extracted with five 30 milliliter portions of ether. The ether extracts are combined, dried with anhydrous magnesium sulfate and concentrated to a dark brown, gummy residue. This is sublimed at 85° C. to about 20 mm. The yield is 1.95 grams of a colorless oily, crystalline solid, 4-methylbicyclo[2.2.2]octan-1-ol. The infrared spectrum shows a small amount of diethylene glycol to be present, but the product is suitable for use in the next step. The yield is 53%.

A solution of 1.95 grams of 4-methylbicyclo[2.2.2]-octan-1-ol in 15 milliliters of acetonitrile is placed in an eight-inch test tube fitted with condenser and thermometer and heated with an oil bath. Silver sulfate, 4.5 grams and 3.0 milliliters of concentrated sulfuric acid are added and the mixture heated to 90° C. Gentle refluxing occurs. The mixture is refluxed eight hours, filtered hot and the filtrate poured into 200 milliliters of water. Crystals separated after standing overnight and are filtered, washed with a little water and dried in a vacuum desiccator at 0.5 mm. over phosphorus pentoxide. The yield of N-acetyl-4-methylbicyclo[2.2.2.]octane-1-amine, M.P., 145.4 to 145.8° C. is 0.66 gram, 26%.

A solution of 0.66 gram of N-acetyl-4-methylbicyclo-[2.2.2]octane-1-amine and 1.26 gram of powdered sodium hydroxide in 8.5 milliliters of diethylene glycol is stirred and refluxed at 170° C. for six hours, then cooled to room temperature and diluted with 21 milliliters of water. This is extracted with four 20 milliliter portions of ether, which are combined, dried with anhydrous magnesium sulfate and concentrated in vacuo (40° C. bath) to a brown oil. This is sublimed at 1 mm. at room temperature. The white crust on the cold condenser is scraped into a vial, where it melts to a clear colorless oil. This is dissolved in 10 milliliters of ether and extracted with 10 milliliters of water containing five drops of concentrated hydrochloric acid. The aqueous layer is concentrated to dryness in vacuo (60° C. bath). The solids are dried in vacuo (80° C.), giving 0.11 gram of 4-methylbicyclo[2.2.2] octane-1-amine hydrochloride, 17.5% yield. This is identical in infrared spectrum to a sample of this compound made from the free amine prepared in Example 3.

EXAMPLE 5

A solution of 5.3 gram of ethyl α-pyrone-3-carboxylate [J. Org. Chem., 28, 1443 (1963)] in 25 ml. of hexane was heated at 180° C. under an ethylene pressure of 3,000 atmospheres for 17 hours in a pressure vessel. The mixture was cooled and the bomb contents were removed. Solvent was distilled from the product at reduced pressure and 50 ml. of methanol was added to the residue to precipitate polymeric materials. The solution was filtered and the filtrate was distilled under reduced pressure to give 2.73 grams, 48%, of bicyclo[2.2.2]oct-2-ene-1-carboxylic acid, ethyl ester.

The following table gives results when other pyrone starting materials were used in this procedure. Ethyl 6-tert-butyl-α-pyrone-3-carboxylate shown in the table was prepared in the following manner:

To a stirred mixture of 12 grams (0.5 mole) of sodium hydride in 350 ml. of ethylene glycol dimethyl ether was added a mixture of 50 grams (0.5 mole) of pinacolone and 108 grams (0.5 mole) of diethyl ethoxymethylenemalonate dropwise over a period of 30 minutes. The mixture was refluxed with stirring for three hours, then cooled to room temperature. The excess sodium hydride was destroyed with ethanol and the reaction mixture was poured into a stirred solution of 116 ml. (120 grams, 2 moles) of glacial acetic acid in 500 ml. of ice water. This was extracted with ether, the ether extracts were washed with saturated aqueous sodium chloride solution and they were dried with anhydrous magnesium sulfate. Removal of the ether at reduced pressure gave 132.28 grams of an oil, which on distillation gave 59.13 grams, (52%) of ethyl 6-tert-butyl-α-pyrone-3-carboxylate as a yellow oil, B.P. 125° C. at 0.25 mm.; B.P. 130° C. at 0.5 mm.; B.P. 145° C. at 0.8 mm.; B.P. 148° C. at 1.0 mm. The other pyrone starting materials shown in the table were prepared by the method described in J. Gen. Chem. U.S.S.R., 28, 1562, 2438 (1958).

| Pyrone | Solvent | Time, hr. | Temp., ° C. | Product | Physical constants |
|---|---|---|---|---|---|
| Ethyl 6-methyl α-pyrone-3-carboxylate. | Benzene | 10 | 180 | 4-methylbicyclo[2.2.2]-oct-2-ene-1-carboxylic acid, ethyl ester. | B.p. 82° C./3.8 mm. $n_D^{25}$ 1.4665. |
| Ethyl 6-ethyl α-pyrone-3-carboxylate | do | 14 | 180 | 4-ethylbicyclo[2.2.2]-oct-2-ene-1-carboxylic acid, ethyl ester. | B.p. 120–130° C./13 mm. |
| Ethyl 6-propyl α-pyrone-3-carboxylate | do | 13 | 180 | 4-propylbicyclo[2.2.2]-oct-2-ene-1-carboxylic acid, ethyl ester (67% yield). | B.p. 112° C./2.2 mm. |
| Ethyl 6-isopropyl-α-pyrone-3-carboxylate. | None | 14 | 180 | 4-isopropylbicyclo-[2.2.2] oct-2-ene-1-carboxylic acid, ethyl ester. | B.p. 120–122° C./6 mm. |
| Ethyl 6-butyl α-pyrone-3-carboxylate | Benzene | 13 | 180 | 4-butylbicyclo[2.2.2]-oct-2-ene-1-carboxylic acid, ethyl ester (87% yield). | After solvent removal, the crude material was used in the next step (Example 5A). |
| Ethyl 6-tert-butyl α-pyrone-3-carboxylate. | None | 14.5 | 180 | 4-tert-butylbicyclo[2.2.2] oct-2-ene-1-carboxylic acid, ethyl ester (91% yield). | After solvent removal, the crude material was used in the next step (Example 5A). |

EXAMPLE 5A

An 18.3 g. amount of bicyclo[2.2.2]oct-2-ene-1-carboxylic acid, ethyl ester was dissolved in 100 ml. of absolute ethanol, 5 g. of settled Raney-Ni catalyst was added and the mixture was hydrogenated in a 500 ml. centrifuge bottle at 30 p.s.i.g. using a Parr low pressure hydrogenation apparatus. Hydrogenation was rapid, but the hydrogenation was continued for a total of two hours. The catalyst was filtered and the filtrate was concentrated in a vacuum to give bicyclo[2.2.2]octane-1-carboxylic acid, ethyl ester as a colorless oil. The yield was 17.4 g., 94%.

The following table gives results when other bicyclo[2.2.2]oct-2-ene-1-carboxylic acid esters were used in this procedure.

| Starting material | Product | Physical constants |
|---|---|---|
| 4-methylbicyclo[2.2.2]-oct-2-ene-1-carboxylic acid, ethyl ester. | 4-methylbicyclo[2.2.2]-octane-1-carboxylic acid, ethyl ester. | M.p. −23.5 to −22.5° C. |
| 4-ethylbicyclo[2.2.2]-oct-2-ene-1-carboxylic acid, ethyl ester. | 4-ethylbicyclo[2-2.2]-octane-1-carboxylic acid, ethyl ester. | After solvent removal the crude material was used in the next step (Example 5B). |
| 4-propylbicyclo[2.2.2]-oct-2-ene-1-carboxylic acid, ethyl ester. | 4-propylbicyclo[2.2.2]octane-1-carboxylic acid, ethyl ester. | After solvent removal the crude material was used in the next step (Example 5B). |
| 4-isopropylbicyclo[2.2.2]-oct-2-ene-1-carboxylic acid, ethyl ester. | 4-isopropylbicyclo[2.2.2]-octane-1-carboxylic acid, ethyl ester. | After solvent removal the crude material was used in the next step (Example 5B). |
| 4-butylbicyclo[2.2.2]-oct-2-ene-1-carboxylic acid, ethyl ester. | 4-butylbicyclo[2.2.2]-octane-1-carboxylic acid, ethyl ester. | After solvent removal the crude material was used in the next step (Example 5B). |
| 4-tert-butylbicyclo[2.2.2]-oct-2-ene-1-carboxylic acid, ethyl ester. | 4-tert-butylbicyclo[2.2.2]-octane-1-carboxylic acid, ethyl ester. | After solvent removal the crude material was used in the next step (Example 5B). |

EXAMPLE 5B

A solution of 17.4 g. (0.0957 mole) of bicyclo[2.2.2]octane-1-carboxylic acid, ethyl ester in 60 ml. of ethanol plus 10.5 ml. of water plus 10.5 g. of potassium hydroxide was refluxed two hours. Then, 15 ml. of water was added and the mixture was cooled to room temperature and concentrated in a vacuum to a colorless solid. A 100 ml. portion of 2 N hydrochloric acid was added and the mixture (containing a thick, colorless precipitate) was extracted with one 200 ml. and three 50 ml. portions of ether. The ether extracts were combined, dried with anhydrous magnesium sulfate and vacuum-concentrated giving a colorless, solid residue of bicyclo[2.2.2]octane-1-carboxylic acid. The yield was 13.90 g., 95% M.P. 135–138° C.

The following table gives results when other bicyclo[2.2.2]octane-1-carboxylic acid esters were used in this procedure.

| Starting material | Product | Physical constants, M.P., /C. |
|---|---|---|
| 4-methylbicyclo[2.2.2]octane-1-carboxylic acid, ethyl ester. | 4-methylbicyclo[2.2.2]-octane-1-carboxylic acid. | 194–195 |
| 4-ethylbicyclo[2.2.2]octane-1-carboxylic acid, ethyl ester. | 4-ethylbicyclo[2.2.2]-octane-1-carboxylic acid. | 178.5–179.5 |
| 4-propylbicyclo[2.2.2]octane-1-carboxylic acid, ethyl ester. | 4-propylbicyclo[2.2.2]-octane-1-carboxylic acid. | 208–209 |
| 4-isopropylbicyclo[2.2.2]octane-1-carboxylic acid, ester. | 4-isopropylbicyclo[2.2.2]-octane-1-carboxylic acid. | 210–212 |
| 4-butylbicyclo[2.2.2]octane-1-carboxylic acid, ethyl ester. | 4-butylbicyclo[2.2.2]octane-1-carboxylic acid. | 158–158.5 |
| 4-tert-butylbicyclo[2.2.2]-octane-1-carboxylic acid, ethyl ester. | 4-tert-butylbicyclo[2.2.2]-octane-1-carboxylic acid. | 281–282.5 |

The following table gives results when the bicyclo[2.2.2]octane-1-carboxylic acids of this example were used in the procedure of Example 2. The 4-alkylbicyclo[2.2.2]octane-1-amines were isolated as the hydrochlorides by passing hydrogen chloride gas into the dried ether solution of the amine. The solid hydrochloride which precipitated was filtered and dried.

and heated at reflux for about two hours. The reaction was cooled to room temperature and the excess lithium aluminum hydride was decomposed by the addition of 5 ml. of saturated sodium sulfate solution. The coagulated solid was removed by filtration and the filtrate, A, was dried over solid sodium hydroxide and distilled. The solid, B, was extracted with ether in a Soxhlet extractor. The ether extract from this, C, was dried over solid sodium hydroxide. Distillation of ether solutions A and C yielded 1.2 g. (14.8%) and 3.0 g. (57%) of N,4-dimethylbicyclo[2.2.2]octane-1-amine, boiling at 69–71° C. at 10 mm., $n_D^{25}$ 1.4770. The NMR of the amine had NH at $\tau$-9.55 (1H), C-methyl at $\tau$-9.24 (3H), methylenes at $\tau$-8.58 (12H), N-methyl at $\tau$-7.81 (3H). The infrared spectrum showed a single NH absorption at 3300 cm.$^{-1}$.

The amine fractions were combined, dissolved in a little ether and hydrogen chloride gas was passed in until precipitation was complete. The precipitate was filtered and recrystallized from an isopropyl alcohol- benzene mixture, yielding 3.8 g. of N,4-dimethylbicyclo[2.2.2]octane-1-amine hydrochloride, M.P. 263.5–264.5° C. (Nalge Block).

Calcd. for $C_{10}H_{20}NCl$ (percent): C, 63.30; H, 10.63; N, 7.38; Cl, 18.01. Found (percent): C, 63.29; H, 10.73; N, 7.34; Cl, 18.25.

EXAMPLE 8

A 250 milliliter flask with reflux condenser, drying tube and stirrer is charged with 0.10 mole of N-acetyl-4-methylbicyclo[2.2.2]octane-1-amine (see Example 4), 100 milliliters of diethylene glycol dimethyl ether and 5.7 grams (0.15 mole) of lithium aluminum hydride. The mixture is heated in an oil bath for eight hours at 60° C. and finally for two hours at 120° C. After cooling, the reaction mixture is treated with water to decompose the excess lithium aluminum hydride. The insoluble aluminum compounds are dissolved by adding a 20% solution of sodium potassium tartrate. The mixture is extracted with ether, the ether extract is dried with anhydrous potassium carbonate and concentrated in vacuo. The residue is suspended in 50 milliliters of water, taken to pH 2 with concentrated hydrochloric acid and the resulting solution is extracted with ether to remove any

| Starting material | Product | Physical constants |
|---|---|---|
| 4-ethylbicycol[2.2.2]octane-1-carboxylic acid. | 4-ethylbicyclo[2.2.2]octane-1-amine hydrochloride. | Calcd. for $C^{10}H^{20}NCl$: C, 63.30; H, 10.62; N, 7.39. Found: C, 63.33, 63.21; H, 10.84, 11.01; N, 6.96. |
| 4-propylbicyclo[2.2.2]octane-1-carboxylic acid. | 4-propylbicyclo[2.2.2]-octane-1-amine hydrochloride. | Calcd. for $C^{11}H^{22}NCl$: C, 64.8; H, 10.8; N, 6.88. Found: C, 64.6; H, 10.47; N, 6.98. |
| 4-isopropylbicyclo[2.2.2]-octane-1-carboxylic acid. | 4-isopropylbicyclo[2.2.2]octane-1-amine hydrochloride. | Calcd. for $C^{11}H^{22}NCl$: C, 64.83; H, 10.88; N, 6.87. Found: C, 64.99; H, 10.93; N, 6.81. |
| 4-butylbicyclo[2.2.2]octane-1-carboxylic acid. | 4-butylbicyclo[2.2.2]octane-1-amine hydrochloride. | Calcd. for $C^{12}H^{24}NCl$: C, 66.2; H, 11.03; N, 6.44. Found: C, 66.35; H, 11.21; N, 6.49. |
| 4-tert-butylbicyclo[2.2.2]octane-1-carboxylic acid. | 4-tert-butylbicyclo[2.2.2]octane-1-amine hydrochloride. | Calcd. for $C^{12}H^{24}NCl$: C, 66.2; H, 11.03; N, 6.44. Found: C, 66.53; H, 11.14; N, 6.90. |

EXAMPLE 6

A 7.8 g. amount of 4-methylbicyclo[2.2.2]octane-1-amine was heated with 2.88 g. of 98% formic acid in about 500 ml. of benzene. The mixture was heated at reflux under an air condenser, allowing the benzene to distill out and the residue was heated at reflux for one hour. The residue was then distilled at atmospheric pressure to yield 8.8 g. (87.5%) of N-formyl-4-methylbicyclo[2.2.2]octane-1-amine, boiling at 300–302° C. The infrared spectrum showed amide NH at 3320 cm.$^{-1}$, formyl hydrogen at 2770 cm.$^{-1}$ and amide carbonyl at 1650 cm.$^{-1}$.

Calcd. for $C_{10}H_{17}NO$ (percent): C, 71.81; H, 10.24; N, 8.38. Found (percent): C, 71.25; H, 10.20; N, 8.56, 8.60.

EXAMPLE 7

A tetrahydrofuran solution of 8.8 g. of N-formyl-4-methylbicyclo[2.2.2]octane-1-amine was dropped into a suspension of 3 g. of lithium aluminum hydride in 125 ml. of ether at a rate sufficient to maintain reflux. The mixture was then stirred overnight at room temperature traces of unreacted starting material. The raffinate is concentrated in vacuo to yield solid N-ethyl-4-methylbicyclo[2.2.2]octane-1-amine hydrochloride.

EXAMPLE 9

A 500 milliliter flask equipped with stirrer and drying tube is charged with 102 grams (1.40 moles) of N-methylacetamide, 0.386 mole of 1-bromobicyclo[2.2.2]octane [C. A. Grob et al., Helv. Chim. Acta, 41, 1191 (1958)] and 121 grams (0.388 mole) of silver sulfate. If the N-methyl-acetamide is not free of water or acetic acid yields are considerably decreased; simple distillation at reduced pressure is satisfactory. The reaction mixture is heated in an oil bath at 100° C. for one hour; then the product is poured into 100 milliliters of cold water. The mixture is extracted with ether, which is dried with magnesium sulfate and concentrated in vacuo to give N-acetyl-N-methylbicyclo[2.2.2]octane-1-amine.

A 250 milliliter flask equipped with a magnetic stirrer and reflux condenser is charged with 0.060 mole of N-acetyl-N-methylbicyclo[2.2.2]octane-1-amine, 12.0 grams (0.30 mole) of sodium hydroxide and 120 milliliters of diethylene glycol. The mixture is refluxed for five hours and the cooled product is poured into 900 milliliters of water. The mixture is extracted with ether and the ether extract is dried with magnesium sulfate and concentrated in vacuo to give N-methylbicyclo[2.2.2]octane-1-amine.

EXAMPLE 10

A solution of 0.10 mole of N-methylbicyclo[2.2.2]octane-1-amine in 46.3 grams (1.0 mole) of 98–100% formic acid is heated at reflux for 18 hours and the mixture is concentrated in vacuo. The residue consists of N-formyl-N-methylbicyclo[2.2.2]octane-1-amine.

N-formyl-N-methylbicyclo[2.2.2]octane-1-amine is reduced to N,N-dimethylbicyclo[2.2.2]octane-1-amine with lithium aluminum hydride by substituting this compound for N-acetyl-4-methylbicyclo[2.2.2]octane-1-amine in the procedure of Example 8, using an 0.10 mole quantity.

EXAMPLE 11

A mixture of 13.2 g. of 4-methylbicyclo[2.2.2]octane-1-amine, 95 g. of methyl iodide, 26.2 g. of anhydrous sodium bicarbonate and 150 ml. of methanol was stirred and refluxed for 16 hours. The solid salt, A, that precipitated was collected on a filter and the filtrate, B, was evaporated to dryness. The residue of B and the solid A were extracted with boiling chloroform and the combined chloroform extracts were evaporated to dryness to give 30 g. of [4 - methylbicyclo[2.2.2]octyl - (1)]N,N,N - trimethylammonium iodide. This quaternary salt was refluxed with 57 g. of ethanolamine for 15 minutes and then poured into a mixture of about 200 g. of ice and water. The resultant solution was extracted with ether in a continuous extractor for about 16 hours. The ether extract was dried over solid sodium hydroxide and then distilled. Distillation gave:

(1) ether.
(2) 55–84° C./11 mm. _____ 0.5 g., $n_D^{25}$ 1.4625
(3) 84–87° C./11 mm. _____ 2.2 g., $n_D^{25}$ 1.4758
(4) 87° C./11 mm. _____ 9.0 g., $n_D^{25}$ 1.4738

Combined Fractions 3 and 4 were dissolved in ether and converted to the hydrochloride by treatment with anhydrous hydrogen chloride. The salt was filtered and recrystallized from a mixture of isopropyl alcohol and benzene. A yield of 12 g. of N,N,4-trimethylbicyclo[2.2.2]octane-1-amine hydrochloride was obtained.

Calcd. for $C_{11}H_{22}NCl$ (percent): C, 64.84; H, 10.88; N, 6.87; Cl, 17.40. Found (percent): C, 64.50; H, 10.80; N, 6.84; Cl, 17.21.

The nuclear magnetic resonance spectrum of this salt is deuterium oxide showed by the 4-methyl group at $\tau$-9.28 (3H), the methylenes at $\tau$-8.42 (12H), the N-methyl groups at $\tau$-7.37 (6H) and the exchanged H of the ammonium salt at $\tau$-5.45 (1H).

EXAMPLE 12

A mixture of 5.26 g. (0.0344 mole) of 4-ethylbicyclo[2.2.2]octane-1-amine, 8 ml. of 98% formic acid and 5 ml. of 37% aqueous formaldehyde was heated at reflux on a steam bath for 15 hours. After cooling, the mixture was made basic with sodium hydroxide solution, was extracted with ether and was dried over anhydrous potassium carbonate. Dry hydrogen chloride was passed into the solution until precipitation was complete, and the precipitate was filtered and dried. The yield of N,N-dimethyl-4-ethylbicyclo[2.2.2]octane-1-amine hydrochloride was 6.0 g., M.P. 206–207° C. This was recrystallized from 40 ml. of benzene to give 5.65 g., M.P. 208–209° C.

Calcd. for $C_{12}H_{24}NCl$ (percent): N, 6.43. Found (percent): N, 6.45..

The following table gives results when other 4-alkylbicyclo[2.2.2]octane-1-amines were used in this procedure.

| Starting amine | Product | Physical constants |
|---|---|---|
| 4-propylbicyclo-[2.2.2]octane-1-amine. | N,N-dimethyl-4-propyl-bicyclo[2.2.2]octane-1-amine hydrochloride. | M.P. 99–100° C. Calcd. for $C_{13}H_{26}NCl$: C, 67.35; H, 11.31; N, 6.04. Found: C, 67.80; H, 11.21; N, 5.88. |
| 4-isopropylbicyclo-[2.2.2]octane-1-amine. | N,N-dimethyl-4-isopropyl-bicyclo[2.2.2]octane-1-amine hydrochloride. | M.P. 245–246° C. Calcd. for $C_{13}H_{26}NCl$: C, 67.35; H, 11.31; N, 6.04. Found: C, 67.19; H, 11.17; N, 5.93, 6.29. |

EXAMPLE 13

A solution of 0.10 mole of N-methylbicyclo[2.2.2]octane-1-amine in 75 milliliters of dry pyridine is stirred while 10.6 grams (0.10 mole) of n-buytryl chloride is added dropwise at such a rate that the temperature does not exceed 50° C. The mixture is then refluxed for one-half hour, cooled and poured into 500 milliliters of cold water. The resulting precipitate is filtered, washed well with water and dried to give N-butyryl-N-methylbicyclo-[2.2.2]octane-1-amine.

By using 0.10 mole of N-butyryl-N-methylbicyclo-[2.2.2]octane-1amine for the N-acetyl-4-methylbicyclo-[2.2.2]octane-1-amine of Example 8, there is obtained N-butyl-N-methylbicyclo[2.2.2]octane-1-amine.

EXAMPLE 14

Using the procedure of Example 9, substituting 119 grams, 1.40 moles, of pyrrolidine-2-one for the 1.40 moles of N-methylacetamide, one obtains N-[bicyclo[2.2.2]octyl-(1)]pyrrolidine-2-one.

By using 0.10 mole of N-[bicyclo[2.2.2]octyl-(1)]pyrrolidine-2-one for the N-acetyl-4-methylbicyclo[2.2.2]octane-1-amine of Example 8, there is obtained N[bicyclo[2.2.2]octyl-(1)]pyrrolidine.

EXAMPLE 15

A solution of 2.5 g. (0.0149 mole) of 4-methylbicyclo[2.2.2]octane-1-carboxylic acid in 10 ml. (16.55 g., 0.139 mole) of thionyl chloride was refluxed two hours, then cooled to room temperature. The excess thionyl chloride was removed at reduced pressure, leaving the acid chloride as a brown oil. Ammonia was bubbled into a stirred, cooled (−10° C.) solution of the acid chloride in 100 ml. of dry chloroform for ten minutes and the reaction was then stirred overnight. The solvent was evaporated in a vacuum and the residue was dissolved in 100 ml. of benzene. Insoluble ammonium chloride was filtered and the filtrate was concentrated to dryness to yield 3.13 g. (100%) of 4-methylbicyclo[2.2.2]octane-1-carboxamide, M.P. 190–192.5° C.

Calcd. for $C_{10}H_{17}NO$ (percent): C, 71.8; H, 10.2; N, 8.38. Found (percent): C, 71.83; H, 10.33; N, 8.48.

The following table gives results when other 4-alkylbicyclo[2.2.2]octane-1-carboxamides were prepared by this procedure.

| Starting acid | Amine | Product |
|---|---|---|
| 4-methylbicyclo[2.2.2]octane-1-carboxylic acid. | Methylamine | N-methyl-4-methylbicyclo[2.2.2]-octane-1-carboxamide. |
| 4-methylbicyclo[2.2.2]-octane-1-carboxylic acid. | Dimethylamine | N,N-dimethyl-4-methyl-bicyclo[2.2.2]octane-1-carboxamide. |
| 4-propylbicyclo[2.2.2]octane-1-carboxylic acid. | Ammonia | 4-propylbicyclo[2.2.2]-octane-1-carboxamide. |
| 4-propylbicyclo[2.2.2]octane-1-carboxylic acid. | Methylamine | N-methyl-4-propylbicyclo[2.2.2]octane-1-carboxamide. |
| 4-propylbicyclo[2.2.2]-octane-1-carboxylic acid. | Dimethylamine | N,N-dimethyl-4-propylbicyclo[2.2.2]octane-1-carboxamide. |

EXAMPLE 15A

A 200 ml. round-bottom flask fitted with a Soxhlet extractor was charged with 1.56 g. of lithium aluminum hydride and 200 ml. of diethyl ether. The extractor cup was charged with 2.7 g. (0.0162 mole) of 4-methylbicyclo[2.2.2]octane-1-carboxamide and the apparatus was operated overnight, stirring the flask contents with a magnetic stirrer. The reaction was cooled to room temperature and the excess lithium aluminum hydride was destroyed by cautiously adding 3.32 ml. (0.184 mole) of water, with stirring. Stirring was continued for one hour. Then the mixture was filtered, the solid being washed well with ether. Filtrate and washings were combined, dried with solid potassium hydroxide and then dried with anhydrous magnesium sulfate. Dry hydrogen chloride gas was bubbled into the ether solution. When precipitation was complete, the product was filtered and dried. The yield of 4-methylbicyclo[2.2.2]octane-1-methylamine hydrochloride was 1.25 g., 41%.

Calcd. for $C_{10}H_{20}NCl$ (percent): C, 63.4; H, 10.0; N, 7.38. Found (percent): C, 63.08; H, 10.34; N, 7.35.

The following table gives results when the carboxamides prepared above were used in this procedure.

of lithium aluminum hydride is destroyed with a water-tetrahydrofuran mixture. Several ml. of 10% sodium hydroxide solution is added to aid in the coagulation of the solids, which are removed by filtration, washed wtih 50 ml. of chloroform and discarded. The filtrate, which includes the tetrahydrofuran solution and the chloroform solution, is saturated with dry hydrogen chloride and then concentrated to dryness in a vacuum at 50° C. The residue is placed in a separatory funnel and shaken with a mixture of 100 ml. of 10% sodium hydroxide and 300 ml. of ether. The aqueous layer is discarded and the ether solution is dried over potassium hydroxide pellets. Dry hydrogen chloride is passed into the ether solution until precipitation is complete and the resultant amine hydrochloride is filtered and dried. This crude salt is dissolved in water, treated with excess 50% sodium hydroxide solution and the free amine is extracted with ether. The ether extract is dried over potassium hydroxide

| Starting Carboxamide | Product | Physical constants |
|---|---|---|
| N-methyl-4-methylbicyclo-[2.2.2]octane-1-carboxamide. | N,4-dimethylbicyclo-[2.2.2]octane-1-methylamine hydrochlorie. | Calcd. for $C_{11}H_{22}NCl$: N, 6.88. Found: N, 6.70. |
| N,N-dimethyl-4-methylbicyclo[2.2.2]octane-1-carboxamide. | N,N,4-trimethylbicyclo-[2.2.2]octane-1-methylamine hydrochloride. | Calcd. for $C_{12}H_{24}NCl$: C, 66.2; H, 11.03; N, 6.44. Found: C, 66.11; H, 11.13; N, 6.47. |
| 4-propylbicyclo[2.2.2] octane-1-carboxamide | 4-propylbicyclo[2.2.2]-octane-1-methylamine hydrochloride. | Calcd. for $C_{12}H_{24}NCl$: N, 6.44. Found: N, 6.55. |
| N-methyl-4-propylbicyclo-[2.2.2]octane-1-carboxamide. | N-methyl-4-propylbicyclo-[2.2.2]octane-1-methylamine hydrochloride. | Calcd. for $C_{13}H_{26}NCl$: C, 67.4; H, 11.23; N, 6.05. Found: C, 67.29; H, 11.14; N, 6.07. |
| N,N-dimethyl-4-propylbicyclo-[2.2.2]octane-1-carboxamide. | N,N-dimethyl-4-propylbicyclo[2.2.2]octane-1-methylamine hydrochloride. | Calcd. for $C_{14}H_{28}NCl$: N, 5.7. Found: N, 5.64. |

EXAMPLE 16

A mixture of 3.6 g. of magnesium turnings, a small crystal of iodine, 11 ml. of anhydrous benzene and 1 ml. of absolute ethanol is heated until a reaction begins. Then heating is discontinued and a mixture of 24.0 g. of diethyl malonate, 7.0 g. of absolute ethanol and 30 ml. of benzene is added dropwise at a rate which causes the reaction mixture to reflux. After addition is completed, the mixture is heated at reflux until the magnesium has dissolved. The excess ethanol is removed by azeotropic distillation with some of the benzene. To the resultant solution of diethyl ethoxymagnesium malonate is added a solution of 18.7 g. of 4-methylbicyclo[2.2.2]octane-1-carboxylic acid chloride in 30 ml. of anhydrous benzene, dropwise, over a 50-minute period. The reaction mixture is refluxed for an additional hour and then cooled in an ice bath. To the cold mixture is added 50 g. of ice followed by sufficient 10% sulfuric acid to cause two clear layers to appear. The layers are separated and the aqueous layer is extracted with two 25 ml. portions of benzene. The extracts are combined with the organic layer, washed with 30 ml. of water and dried with anhydrous sodium sulfate. The benzene is removed by vacuum concentration at 40°. A solution of 64 ml. of glacial acetic acid, 39 ml. of water and 7 ml. of concentrated sulfuric acid is added to the residue (32 g.), and the mixture is heated at reflux for seven hours. Then it is cooled and poured into 350 ml. of water. The mixture is extracted with two 50 ml. portions of ether, which are combined, dried with anhydrous magnesium sulfate and vacuum concentrated to yield 4-methylbicyclo[2.2.2]octyl-(1) methyl ketone.

A mixture of 14 g. of hydroxylamine hydrochloride, 65 ml. of anhydrous pyridine and 65 ml. of anhydrous ethanol is heated on a steam bath until a clear solution is obtained. To this is added 12.5 g. of 4-methylbicyclo-[2.2.2]octyl-(1) methyl ketone and the mixture is heated at reflux for two hours, then cooled. It is concentrated to dryness in a vacuum at 70° C., and the residue is suspended in 150 ml. of water and stirred well. The solids are filtered and dried to yield 4-methylbicyclo[2.2.2]octyl-(1) methyl ketone oxime.

A 7.8 g. amount of 4-methylbicyclo[2.2.2]octyl-(1) methyl ketone oxime is added to a mixture of 3.3 g. of lithium aluminum hydride in 150 ml. of anhydrous tetrahydrofuran and the mixture is stirred and heated at reflux for three hours. It is cooled in an ice bath and the excess pellets, decanted and hydrogen chloride is passed in until precipitation is complete. The precipitate is filtered and dried to yield α,4-dimethylbicyclo[2.2.2]octane-1-methylamine hydrochloride.

EXAMPLE 17

To a solution of 27.4 g. of bicyclo[2.2.2]octane-1-carboxylic acid chloride in 500 ml. of anhydrous ether under a nitrogen atmosphere is added, dropwise, 150 ml. of commercial 3 M methyl magnesium bromide at a rate which maintains a gentle reflux. The reaction mixture is heated for one hour after the addition, then cooled. To decompose the metal complex, 300 ml. of saturated ammonium chloride is added. The ether layer is separated and the aqueous layer is extracted with 100 ml. of chloroform. This extract is combined with the ether layer and the mixture is dried with anhydrous magnesium sulfate and vacuum-concentrated to dryness at 35° C. The residue is steam-distilled until the distillate is no longer milky, about three liters of distillate being collected. After cooling, the steam distillate is extracted with two 250 ml. portions of ether, which are combined, dried with anhydrous magnesium sulfate and vacuum concentrated to yield α,α-dimethyl-1-bicyclo[2.2.2]octane-1-methanol.

A 35 ml. amount of concentrated sulfuric acid is added dropwise with cooling to hold the temperature below 10° C. to 160 ml. of acetonitrile. Then, 18.2 g. of α,α-dimethylbicyclo[2.2.2]octane-1-methanol is added. The temperature is raised to 48° C. and maintained at 48° C. for 45 minutes. The reaction mixture is allowed to cool to room temperature and is then slowly poured into 1000 ml. of ice water. The solids which separate are filtered and dried and then taken up in 500 ml. of ether. Dry hydrogen chloride is bubbled into the ether solution until no further precipitation occurs. The solids are filtered, dried and placed in a separatory funnel containing 200 ml. of water and 500 ml. of ether. This is shaken until the solids dissolve and the aqueous layer is separated and discarded. The ether solution is dried with anhydrous sodium sulfate and concentrated to dryness to give N-acetyl-α,α-dimethylbicyclo[2.2.2]octane-1-methylamine.

A mixture of 2.0 g. of N-acetyl-α,α-dimethylbicyclo[2.2.2]octane-1-methylamine, 10 g. of potassium hydroxide and 40 ml. of methanol is heated at 225° C. in a sealed tube for 18 hours, then cooled. The tube contents are added to 100 ml. of water and the mixture is extracted with two 50 ml. portions of ether. The extracts are combined, dried with potassium hydroxide pellets and dry hydrogen chloride is bubbled in until precipitation is complete. The precipitate is filtered and dried to give a crude salt. This is dissolved in 80 ml. of water and treated with an excess of 50% sodium hydroxide, then extracted with two 50 ml. portions of ether. The ether extracts are combined, dried with potassium hydroxide pellets and hydrogen chloride is bubbled in until precipitation is complete. The hydrochloride is filtered and dried to yield α,α-dimethylbicyclo[2.2.2]octane - 1-methylamine hydrochloride.

EXAMPLE 18

To a mixture of 1.5 g. of lithium aluminium hydride in 100 ml. of anhydrous diethylene glycol, dimethyl ether is added 4.0 g. of N-acetyl-α,α-dimethylbicyclo[2.2.2]octane-1-methylamine, prepared in Example 17. The reaction mixture is stirred and heated at reflux for three hours, then cooled in an ice bath. The excess lithium aluminum hydride is decomposed by adding wet diethylene glycol, dimethyl ether. Several ml. of 10% sodium hydroxide is added to coagulate the precipitate, which is then filtered and washed with 50 ml. of ether. The filtrate is treated with dry hydrogen chloride until no additional precipitate forms. This is filtered, dissolved in 100 ml. of water, and an excess of 50% sodium hydroxide is added. The mixture is extracted with three 30 ml. portions of ether and the ether extracts are combined, dried with potassium hydroxide pellets and treated with hydrogen chloride until precipitation is complete. This precipitate is filtered and dried to yield N-ethyl-α,α-dimethylbicyclo[2.2.2]octane-1-methylamine hydrochloride.

EXAMPLE 19

A solution of diethyl cadmium in benzene is prepared by adding 19.6 g. of powdered anhydrous cadmium chloride over a 5-minute period to 0.2 mole of ethyl magnesium bromide in 100 ml. of anhydrous ether at ice bath temperature. The mixture is heated at reflux with vigorous stirring for 30 minutes. Then, the ether is removed by distillation on a steam bath and 65 ml. of benzene is added to the nearly dry, brown, pasty residue. Distillation is continued until the vapor temperature of the distillate reaches 61° C. An additional 100 ml. of benzene is added to the diethyl cadmium solution and the solution is again heated to reflux. Heating is discontinued, vigorous stirring is begun and a solution of 17.2 g. of bicyclo[2.2.2]octane-1-carboxylic acid chloride is added as rapidly as the exothermic reaction will allow. Refluxing and stirring is continued for an additional 45 minutes. The reaction mixture is cooled in an ice bath and 200 g. of water and ice is added, followed by 150 ml. of 20% sulfuric acid. The benzene layer is separated and the aqueous layer is extracted with 75 ml. of benzene. The benzene solutions are combined, dried with anhydrous sodium carbonate and the benzene is removed by vacuum concentration at 50° C. to yield a residue of bicyclo[2.2.2]octyl-(1) ethyl ketone.

A mixture of 75 ml. of anhydrous ethanol, 75 ml. of anhydrous pyridine, 16 g. of hydroxylamine hydrochloride and 13.8 g. of bicyclo[2.2.2]octyl-(1) methyl ketone is heated at reflux for two hours and then vacuum concentrated to semi-dryness at 80° C. A 200 ml. amount of water is added and the mixture is again concentrated to semi-dryness. The residue is suspended in 300 ml. of water and the solids are filtered to yield bicyclo[2.2.2]octyl-(1) ethyl ketone oxime.

A 6.7 g. quantity of bicyclo[2.2.2]octyl-(1) ethyl ketone oxime is added to a mixture of 3.0 g. of lithium aluminum hydride and 150 ml. of anhydrous diethylene glycol dimethyl ether and the mixture is stirred and heated at reflux for three hours. It is cooled to 10° C. with an ice bath and the excess lithium aluminum hydride is destroyed with wet diethylene glycol dimethyl ether. Five ml. of 10% sodium hydroxide is added to coagulate the solids, which are then filtered, washed with 50 ml. of ether and discarded. The filtrate is saturated with dry hydrogen chloride and vacuum concentrated until precipitation is complete. The concentrated filtrate is cooled and the solids are filtered, washed with ether and dried. The dried salt is dissolved in 150 ml. of water and the solution is treated with excess 50% sodium hydroxide and extracted with two 50 ml. portions of ether. The ether extracts are combined, dried with potassium hydroxide pellets and treated with dry hydrogen chloride until precipitation is complete. The precipitate is filtered and dried to give α-ethylbicyclo[2.2.2]octane-1-methylamine hydrochloride.

EXAMPLE 20

Substitution of 0.10 mole of cyclopropanecarboxylic acid chloride for the 0.10 mole of n-butyryl chloride in Example 13 gives N-cyclopropylmethyl-N-methylbicyclo[2.2.2]octane-1-amine.

EXAMPLE 21

A 100 milliliter three-necked flask with stirrer, dropping funnel, condenser and ice bath is charged with 5.00 grams of 1-bromobicyclo[2.2.2]octane and 20 milliliters of liquid HCN. Then four milliliters of concentrated sulfuric acid is dropped in and the mixture is stirred for four hours. The excess HCN is allowed to evaporate into a trap for separate disposal and water is added cautiously to the reaction flask. The precipitate is filtered and washed with water. After drying, it is chromatographed on silicic acid with chloroform as the eluent, giving N-formyl-bicyclo[2.2.2]octane-1-amine.

EXAMPLE 22

A 2 liter, 4 necked, round-bottom flask is equipped with thermometer, dropping funnel, reflux condenser, paddle stirrer and a connection to a gas meter and charged with 500 ml. of absolute ethanol, 50.4 g. (0.60 mole) of sodium bicarbonate and 0.20 mole of 4-methyl-bicyclo[2.2.2]octane-1-amine hydrochloride. Then, 24.2 g. (0.20 mole) of allyl bromide is added from the dropping funnel. There is no appreciable evolution of carbon dioxide. The mixture is gradually warmed to 65° C., when gas evolution begins. The reaction is allowed to proceed until no more gas is evolved (about 1.5 liters). The mixture is cooled, the solids are filtered and the filtrate is evaporated. The residue is distributed between ether and 10% sodium hydroxide solution. The ether layer is dried with anhydrous potassium carbonate and evaporated to give an oil. This is distilled at reduced pressure to give two main fractions. The lower-boiling fraction is N-allyl-4-methylbicyclo[2.2.2]octane-1-amine. The higher is N,N-diallyl-4-methylbicyclo[2.2.2]octane-1-amine.

EXAMPLE 23

A 2 liter, 4 necked, round-bottom flask is equipped with thermometer, dropping funnel, reflux condenser, paddle stirrer and a connection to a gas meter. It is charged with 500 ml. of absolute ethanol, 50.4 g. (0.60 mole) of sodium bicarbonate and 0.02 mole of N-methyl-4-ethylbicyclo[2.2.2]octane - 1 - methylamine hydrochloride. Then 24.2 g. (0.20 mole) of allyl bromide is added from the dropping funnel. The mixture is gradually warmed to 65° C., when gas evolution begins. The reaction is allowed to proceed until no more gas is evolved. It is cooled, the solids are filtered and the filtrate is evaporated. The residue is distributed between ether and 10% sodium hydroxide solution. The ether layer is dried with anhydrous potassium carbonate and evaporated to give a residue of N - allyl-N - methyl - 4 - ethylbicyclo[2.2.2]octane-1-methylamine.

EXAMPLE 24

A reaction is run as described in Example 22 using (0.20 mole) of bicyclo[2.2.2]octane-1-amine hydrochloride, 16.4 (0.20 mole) of propargyl chloride, 50.4 g.

(0.60 mole) of sodium bicarbonate and 500 ml. of absolute ethanol. The cooled mixture is filtered and the filtrate is evaporated. The residue is distributed between 10% sodium hydroxide and ether. The ether layer is dried over potassium carbonate and evaporated. The residue is distilled at reduced pressure to yield N-propargylbicyclo[2.2.2]octane-1-amine.

EXAMPLE 25

A 300 milliliter round-bottom flask with condenser, stirrer and thermometer is charged with 0.10 mole of 1-bromobicyclo[2.2.2]octane, 128 grams (4.1 moles) of dry formamide, 31.18 grams (0.10 mole) of silver sulfate and 32 milliliters of concentrated sulfuric acid. The mixture is stirred and heated on the steam bath for three hours, after which it is cooled and diluted with 300 milliliters of water. The mixture is extracted with 300 milliliters of chloroform, which is dried with anhydrous magnesium sulfate and concentrated in vacuo. The residue is recrystallized from cyclohexane and from water to give N-formyl-bicyclo[2.2.2]octane-1-amine.

EXAMPLE 26

A solution of 0.5 mole of bicyclo[2.2.2]octane-1-amine in 120 milliliters of tetrahydrofuran and 30 milliliters of water is charged into a 400 milliliter stainless steel autoclave and 5.0 grams (0.11 mole) of ethylene oxide is injected. The autoclave is heated to 70° C. for 24 hours after which time it is cooled and cautiously vented. Solvent is removed at reduced pressure and the residue is extracted with ether. The ether extract is dried with anhydrous potassium carbonate. Solvent is removed at reduced pressure and the residue is subjected to sublimitation is distilled under vacuum to yield N-2-hydroxybicyclo[2.2.2]octane-1-amine. The residue from the sublimation is distilled under vacuum to yield N-(2-hydroxyethyl)bicyclo[2.2.2]octane-1-amine.

EXAMPLE 27

A mixture of 0.10 mole of bicyclo[2.2.2]octane-1-amine (see Example 1) and 9.87 grams (0.10 mole) of 38% hydrochloric acid in 100 milliliters of water is concentrated in vacuo at 60° C. The resulting salt, bicyclo[2.2.2]octane-1-amine hydrochloride, is dried in vacuo at 60° C.

EXAMPLES 28–38

Example 27 is repeated substituting the following indicated reactants for those of that example, to obtain the indicated product.

ether until precipitation is complete. The precipitate is filtered and dried in vacuo to give bicyclo[2.2.2]octane-1-amine bicarbonate.

The preceding examples can be repeated substituting equivalent amounts of appropriate starting materials to obtain other compounds of this invention including those listed hereinbefore.

The compounds of Formula 1 above can be administered in the antiviral treatment according to this invention by any means that effects contact of the active ingredient compound with the site of virus infection in the body. It will be understood that this includes the site prior to infection setting in as well as after. For example, administration can be parenterally, that is subcutaneously, intravenously, intramuscularly or intraperitoneally. Alternatively or concurrently, the compounds are effective on administration by the oral route. Since they are particularly effective against respiratory infections such as viral influenza and viral pneumonia, administration can be by vapor or spray through the mouth or nasal passages.

The compounds within the scope of this invention are valuable for viral prophylaxis, as well as for therapeutic treatment.

The dosage administered will be dependent upon the virus being treated, the age, health and weight of the recipient, the extent of infection, kind of concurrent treatment if any, frequency of treatment and the nature of the effect desired. Generally, a daily dosage of active ingredient compound will be from about 0.1 to 25 milligrams per kilogram of body weight, although lower, such as 0.5 milligram per kilogram, or higher amounts can be used. Ordinarily, from 0.25 to 15 and preferably 0.5 to 10 milligrams per kilogram per day, in one or more applications per day, is effective to obtain the desired result.

The active ingredient of Formula 1 can be employed in useful compositions according to the present invention is such dosage forms as tablets, capsules, powder packets, or liquid solutions, suspensions or elixirs, for oral administration or liquid solutions for parenteral use, and in certain cases suspensions for parenteral use (except intravenous). In such compositions the active ingredient will ordinarily always be present in an amount of at least 0.5% by weight based on the total weight of the composition and not more than 90% by weight.

Besides the active ingredient of Formula 1 the antiviral composition will contain a solid or liquid nontoxic pharmaceutical carrier for the active ingredient.

| Example No. | Product of example | Acid | Product |
| --- | --- | --- | --- |
| 28 | 2 (0.10 mole) | 48% hydrobromic acid (0.10 mole) | Bicyclo[2.2.2]octane-1-amine, hydrobromide. |
| 29 | 3 (0.10 mole) | 85% phosphoric acid (0.10 mole) | 4-methylbicyclo[2.2.2]-octane-1-amine, dihydrogen phosphate. |
| 30 | 9 (0.10 mole) | Sulfuric acid (0.10 mole) | N-methylbicyclo[2.2.2]-octane-1-amine, hydrogen sulfate. |
| 31 | 10 (0.10 mole) | Tartaric acid (0.10 mole) | N,N-dimethylbicyclo[2.2.2]-octane-1-amine, hydrogen tartrate. |
| 32 | 13 (0.10 mole) | Maleic acid (0.10 mole) | N-butyl-N-methyl-aminobicyclo[2.2.2]octane-1-amine, hydrogen maleate. |
| 33 | 12 (0.10 mole) | Perchloric acid (0.10 mole) | N,N-dimethyl-4-ethyl-bicyclo[2.2.2=1]-octane-1-amine perchlorate. |
| 34 | 14 (0.10 mole) | Acetic acid (0.10 mole) | N-[bicyclo(2.2.2)octyl-(1)-]pyrrolidine, acetate. |
| 35 | 16 (0.10 mole) | Citric acid (0.10 mole) | α,4-dimethylbicyclo[2.2.2]-octane-1-methylamine dihydrogen citrate. |
| 36 | 20 (0.10 mole) | Succinic acid (0.10 mole) | N-cyclopropylmethyl-N-methylbicyclo[2.2.2]-1-amine hydrogen succinate. |
| 37 | 2 (0.10 mole) | Mandelic acid (0.10 mole) | Bicyclo[2.2.2]octane-1-amine, mandelate. |
| 38 | 3 (0.10 mole) | Lactic acid (0.10 mole) | 4-methylbicyclo[2.2.2]-octane-1-amine, lactate. |

EXAMPLE 39

A solution of 0.20 mole of bicyclo[2.2.2]octane-1-amine hydrochloride in 100 milliliters of water is added to a solution of 0.10 mole of pamoic acid, disodium salt [4,4'-methylene-bis(3-hydroxy-2-naphthoic acid), disodium salt] in 500 milliliters of water. The resulting precipitate is filtered, washed well with water and dried in vacuo to give bicyclo[2.2.2]octane-1-amine pamoate.

EXAMPLE 40

Carbon dioxide is passed into a solution of 0.10 mole of bicyclo[2.2.2]octane-1-amine in 100 milliliters of ethyl In one embodiment of a pharmaceutical composition of this invention, the solid carrier is a capsule which can be of the ordinary gelatin type. In the capsule will be from about 30–60% by weight of a compound of formula 1 or 2 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredients, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25% and preferably about 1 to 10% by weight of the active ingredient.

As mentioned above, oral administration can be in a suitable suspension or syrup, in which the active ingredient ordinarily will constitute from about 0.5 to 10% and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain the present invention.

EXAMPLE 41

A large number of unit capsules are prepared by filling standard two-piece hard gelatin capsules weighing about 50 milligrams each with 50 milligrams of powdered bicyclo[2.2.2]octane-1-amine hydrochloride, 125 milligrams of lactose and 1 milligram of "Cab-O-Sil."

EXAMPLE 42

Example 41 is repeated except that soft gelatin capsules are used and the powdered bicyclo[2.2.2]octane-1-amine is first dissolved in mineral oil.

EXAMPLE 43

Example 41 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used by applying appropriate coatings. A sugar coating may be applied to increase palatability.

EXAMPLE 44

A parenteral composition suitable for administration by injection is prepared by stirring 5% by weight of the active ingredient of Example 42 in sterile aqueous 0.9% saline.

A large variety of compositions according to this invention can thus readily be made by substituting other compounds of this invention and including specifically but not limited to compounds of this invention that have specifically been named hereinbefore. The compounds will be used in the amounts indicated in accordance with procedures well known and described in the Martin and Cook text mentioned above.

The compounds of this invention are particularly effective against swine influenza. An important embodiment of this invention therefore is the control of this infection by incorporating an active ingredient compound in the diet of the affected animal. For most purposes, an amount of active compound will be used to provide from about 0.001% to 0.1% by weight of the active compound based on the total weight of feed intake. Preferably, from 0.001% to 0.02% by weight will be used.

In a related aspect, novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrison Publishing Company of Ithaca, N.Y., 1948, 21st edition. The selection of the particular feed is within the knowledge of the art and will depend of course on the animal, the economics, natural materials available, the surrounding circumstances and the nature of the effect desired, as will be readily understood.

Particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention.

EXAMPLE 45

A feed for pigs is prepared as follows:

|  | Pounds |
|---|---|
| Oat groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
|  | 2051 |

There is added to the pigs' diet a concentrate of 50% of N-methylbicyclo[2.2.2]octane-1-amine hydrochloride as the active ingredient and 50% by weight corn flour, in an amount that provides 0.015% by weight of the active ingredient based on the total diet.

The disclosure herein should not be taken as a recommendation to use the disclosed invention in any way without full compliance with U.S. Food and Drug laws and other laws and governmental regulations which may be applicable.

The above and similar examples can be carried out in accordance with the teachings of this invention, as will be readily understood by persons skilled in the art, by substitution of components and amounts in place of those specified. The foregoing detailed description has been given for clearness of understanding only and no unnecessary limitations are to be understood therefrom.

What is claimed is:
1. Compounds of the formula

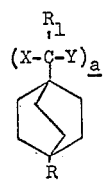

wherein R is hydrogen or alkyl of 1 through 4 carbon atoms; $a$ is 0 or 1; X and Y can be the same or different and are hydrogen, methyl or ethyl; and $R_1$ is

wherein $R_2$ and $R_3$ are the same or different and are hydrogen, alkyl of 1 through 4 carbon atoms, alkenyl of 3 through 5 carbon atoms, wherein the unsaturated bond is in other than the 1-position, propargyl, β-hydroxyethyl, cyclopropyl, cyclobutyl or cyclopropylmethyl; with the proviso that when $R_1$ is

and one or both of $R_2$ and $R_3$ are allyl, the sum of the carbon atoms in $R_1$, $R_2$ and $R_3$ does not exceed 7 and the proviso that when $R_1$ is

and $R_2$ and $R_3$ are both other than allyl, the sum of the carbon atoms in $R_1$, $R_2$ and $R_3$ does not exceed 5; and nontoxic acid addition salts of said compounds.

2. 4-methylbicyclo[2.2.2]octane-1-amine.
3. α-Methylbicyclo[2.2.2]octane-1-methylamine.
4. α,α-Dimethylbicyclo[2.2.2]octane-1-methylamine.
5. α,4-dimethylbicyclo[2.2.2]octane-1-methylamine.
6. α,α,4-trimethylbicyclo[2.2.2]octane-1-methylamine.

References Cited

UNITED STATES PATENTS 3,228,984   1/1966   Humber _____ 260—563

CHARLES B. PARKER, Primary Examiner

D. R. PHILLIPS, Assistant Examiner

U.S. Cl. X.R.

99—2; 260—239, 239.1, 293, 313.1, 326.8, 326.85, 345.8, 347.3, 347.7, 457, 468, 490, 501.1, 501.21, 514, 544, 557, 561, 566, 567.6, 586, 617, 648; 424—244, 267, 274, 315, 317, 326